(12) United States Patent
Ziedan et al.

(10) Patent No.: US 10,713,677 B2
(45) Date of Patent: Jul. 14, 2020

(54) METHOD AND SYSTEM FOR SOCIAL SAVINGS PLATFORM VIA BLOCKCHAIN

(71) Applicant: MASTERCARD ASIA/PACIFIC PTE. LTD., Singapore (SG)

(72) Inventors: Mhd Zuhir Ziedan, South Brisbane (AU); Maissoun Abou Hamra, South Brisbane (AU)

(73) Assignee: MASTERCARD ASIA/PACIFIC PTE. LTD., Singapore (SG)

( * ) Notice: Subject to any disclaimer, the term of this patent is extended or adjusted under 35 U.S.C. 154(b) by 219 days.

(21) Appl. No.: 15/840,167

(22) Filed: Dec. 13, 2017

(65) Prior Publication Data

US 2019/0180308 A1    Jun. 13, 2019

(51) Int. Cl.
*G06Q 30/02*  (2012.01)
*G06Q 50/00*  (2012.01)
*G06Q 40/02*  (2012.01)

(52) U.S. Cl.
CPC ......... *G06Q 30/0216* (2013.01); *G06Q 40/02* (2013.01); *G06Q 50/01* (2013.01)

(58) Field of Classification Search
CPC .................................................. G06Q 30/02
See application file for complete search history.

(56) References Cited

U.S. PATENT DOCUMENTS

| 9,672,573 | B2* | 6/2017 | Courter ............ G06Q 10/06398 |
| 2016/0027106 | A1 | 1/2016 | Shahab et al. |
| 2016/0335533 | A1 | 11/2016 | Davis et al. |
| 2016/0342978 | A1 | 11/2016 | Davis et al. |
| 2017/0230375 | A1 | 8/2017 | Kurian |
| 2017/0236104 | A1* | 8/2017 | Biton ................... G06O 20/065 705/64 |
| 2018/0075453 | A1* | 3/2018 | Durvasula .......... G06Q 20/4016 |
| 2019/0081918 | A1* | 3/2019 | Kamrani ................ H04L 51/20 |

OTHER PUBLICATIONS

International Search Report and Written Opinion (Forms PCT/ISA/210, PCT/ISA/220, and PCT/ISA/237) dated Mar. 12, 2019, by the Japan Patent Office in corresponding International Application No. PCT/SG2018/050605. (11 pages).

\* cited by examiner

*Primary Examiner* — Marilyn G Macasiano
(74) *Attorney, Agent, or Firm* — Buchanan Ingersoll & Rooney PC

(57) ABSTRACT

A method for social saving via blockchain includes: storing blockchain data for a blockchain, each block including at least a block header and blockchain data values associated with each of a plurality of social saving communities including, for each community, account identifiers associated with a plurality of transaction accounts issued by a plurality of issuing institutions; receiving a transaction notification for each account for each community, the notification including the account identifier, a transaction amount, and a confirmation of payment from the issuing institution; updating the blockchain to include, for each transaction, a new blockchain data value that includes the account identifier, transaction amount, and a community identifier; identifying a single account for each community; and initiating payment of a reward amount to the account for each community, wherein the reward amount is based on a sum of amounts received for the respective community.

16 Claims, 5 Drawing Sheets

METHOD AND SYSTEM FOR SOCIAL SAVINGS PLATFORM VIA BLOCKCHAIN

FIELD

The present disclosure relates to social saving via blockchain, specifically enabling a community of individuals or other entities to have a shared savings pool that is funded through multiple issuing institutions that is facilitated via a blockchain for accounting, auditability, and to ensure immutability of record keeping.

BACKGROUND

Social savings communities have been around nearly as long as communities themselves. Historically, communities would come together and pool resources that could be shared among the others at necessary times to provide assistance to one another and foster stability. Traditionally, such resources were often food, tools, and other physical commodities. In time, social savings communities that worked together for saving money began to form. In a social savings community, multiple members come together to pool their money. At predetermined intervals of time, a member will be paid out a larger sum from the pool, and the pooling then payout process will continue until it has cycled through every member. This enables groups of individuals to work together to save money that they may have spent otherwise, and receive the payout in a random or predetermined/agreed order for fairness and to remove expectations on the part of the receiving individuals, which may further assist in savings.

Traditionally, such groups were facilitated through the gathering of physical currency. For instance, each person in the group may throw their cash into a jar, with one person, sometimes a third party not in the group (e.g., a bank, trusted friend, etc.), being entrusted to keep the jar and its contents safe until the payout is made. However, in more modern times where a vast amount of banking is done electronically, there are no easy analogues. If group members wanted to pool their money electronically, they would have to select a single account to gather the money into, where control of and access to the account may be contentious. In addition, it is often more difficult to transfer currency from one account to another if the other account is out of the first individual's control, and more so if the account is issued by a different issuing institution. Furthermore, it requires additional trust, as the account may not be easily monitored and controlled, unlike a physical jar where each individual could easily see the contents inside and, if need be, intervention (e.g., taking back the jar) performed.

Thus, there is a need for a modern technological solution to enable a social savings community to be formed that is not limited by financial institution and has complete transparency and auditability, as well as being secure and scalable so that thousands or tens of thousands of such savings groups can be supported and served substantially simultaneously in an real world environment in a way the prior ways cannot, thus representing a technological advance over these prior systems.

SUMMARY

The present disclosure provides a description of systems and methods for social saving via blockchain. Multiple individuals or other entities agree to join a social savings community, without having to have any knowledge of the community or its other members. Transfers of currency are made from any of a plurality of issuing institutions into a centralized account held by the platform, with every single transfer being documented in a blockchain. After a predetermined interval, payout is made to one of the members, and the process repeated over time until every member has been paid out. Each deposit and payout are tracked on the blockchain, which provides complete transparency to every member of the community to ensure that every other member has submitted their share and that the pay outs are being performed fairly. In addition, the immutable record on the blockchain provides auditability, which can assist an individual in proving their contribution, and may also be useful for taxes and other instances where such record keeping may be beneficial.

A method for social saving via blockchain includes: storing, in a memory of a processing server, blockchain data for a blockchain comprised of a plurality of blocks, each block including at least a block header and one or more blockchain data values, wherein the blockchain data includes blockchain data values associated with each of a plurality of social saving communities including, for each social saving community, account identifiers associated with a plurality of transaction accounts, where the transaction accounts are issued by a plurality of issuing institutions; receiving, by a receiver of the processing server, a transaction notification for each associated transaction account for each of the plurality of social saving communities, wherein the transaction notification includes at least the associated account identifier, a transaction amount, and a confirmation of payment from the respective issuing institution; updating, by the processing server, the blockchain to include, for each received transaction notification, a new blockchain data value that includes at least the included account identifier, transaction amount, and an identifier associated with the associated social saving community; identifying, by the processing server, a single transaction account associated with each social saving community; and initiating, by the processing server, a payment transaction for payment of a reward amount to the single transaction account for each social saving community, wherein the reward amount is based on a sum of the transaction amount included in each transaction notification received for the respective social saving community.

A system for social saving via blockchain includes: a memory of a processing server configured to store blockchain data for a blockchain comprised of a plurality of blocks, each block including at least a block header and one or more blockchain data values, wherein the blockchain data includes blockchain data values associated with each of a plurality of social saving communities including, for each social saving community, account identifiers associated with a plurality of transaction accounts, where the transaction accounts are issued by a plurality of issuing institutions; a receiver of the processing server configured to receive a transaction notification for each associated transaction account for each of the plurality of social saving communities, wherein the transaction notification includes at least the associated account identifier, a transaction amount, and a confirmation of payment from the respective issuing institution; and the processing server, wherein the processing server is configured to update the blockchain to include, for each received transaction notification, a new blockchain data value that includes at least the included account identifier, transaction amount, and an identifier associated with the associated social saving community, identify a single transaction account associated with each social saving community, and initiate a payment transaction for payment of a reward amount to the single transaction account for each social saving community, wherein the reward amount is based on a sum of the transaction amount included in each transaction notification received for the respective social saving community.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
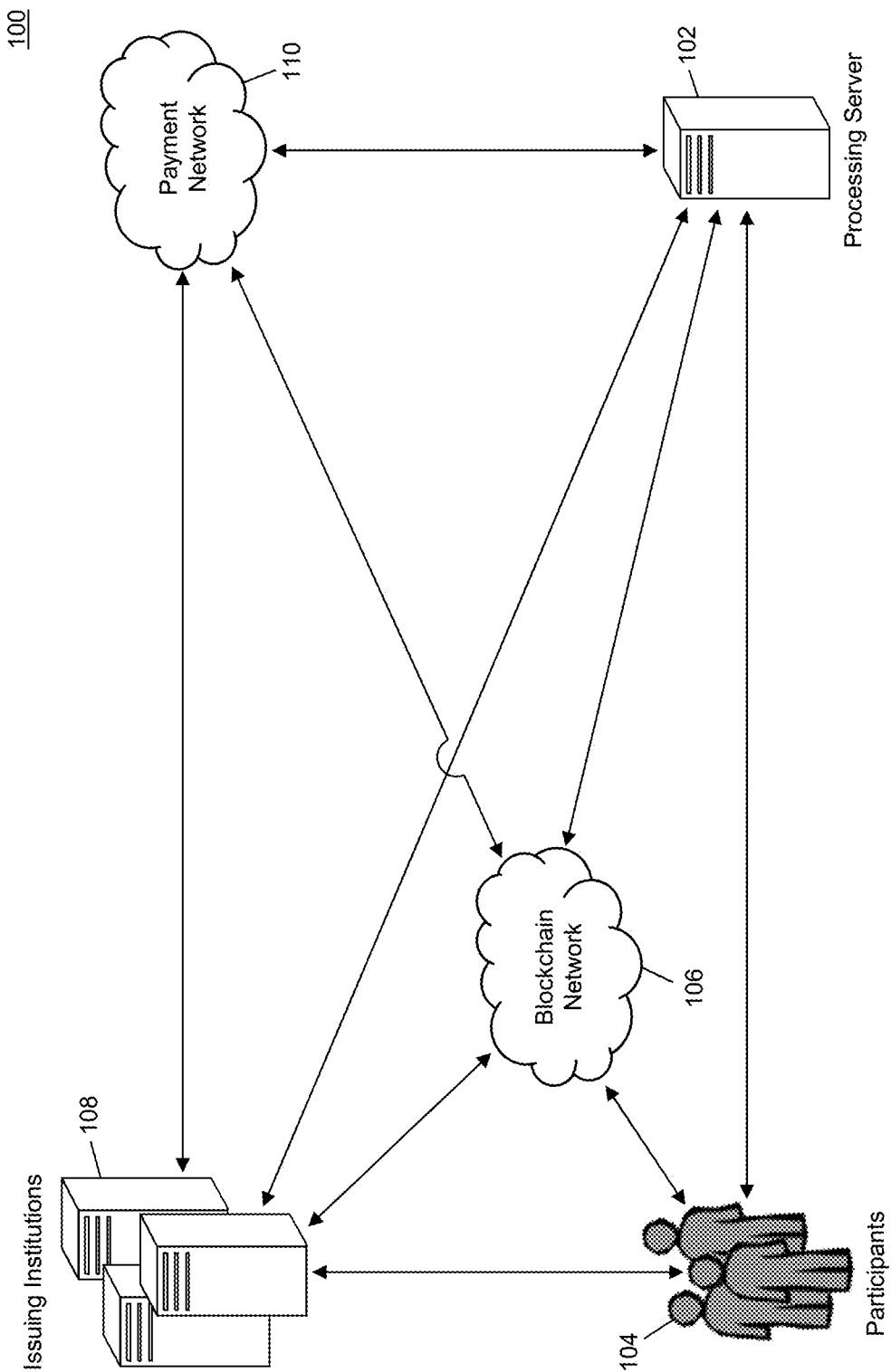
FIG. 1 is a block diagram illustrating a high level system architecture for a social savings community facilitated via blockchain in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes for thousands, millions, and even billions of transactions during a given period. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Payment Rails—Infrastructure associated with a payment network used in the processing of payment transactions and the communication of transaction messages and other similar data between the payment network and other entities interconnected with the payment network that handles thousands, millions, and even billions of transactions during a given period. The payment rails may be comprised of the hardware used to establish the payment network and the interconnections between the payment network and other associated entities, such as financial institutions, gateway processors, etc. In some instances, payment rails may also be affected by software, such as via special programming of the communication hardware and devices that comprise the payment rails. For example, the payment rails may include specifically configured computing devices that are specially configured for the routing of transaction messages, which may be specially formatted data messages that are electronically transmitted via the payment rails.

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Blockchain—A public, distributed ledger of all transactions of a blockchain-based network. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

Issuer—An entity that establishes (e.g., opens) a letter or line of credit in favor of a beneficiary, and honors drafts drawn by the beneficiary against the amount specified in the letter or line of credit. In many instances, the issuer may be a bank or other financial institution authorized to open lines of credit. In some instances, any entity that may extend a line of credit to a beneficiary may be considered an issuer. The line of credit opened by the issuer may be represented in the form of a payment account, and may be drawn on by the beneficiary via the use of a payment card. An issuer may also offer additional types of payment accounts to consumers as will be apparent to persons having skill in the relevant art, such as debit accounts, prepaid accounts, electronic wallet accounts, savings accounts, checking accounts, etc., and may provide consumers with physical or non-physical means for accessing and/or utilizing such an account, such as debit cards, prepaid cards, automated teller machine cards, electronic wallets, checks, etc.

System for Social Saving Via Blockchain

FIG. 1 illustrates a system 100 for a social savings community for participants across a plurality of issuing institutions that is facilitated via the use of a blockchain.

The system 100 may include a processing server 102. The processing server 102, discussed in more detail below, may be configured to facilitate a social savings community for a plurality of different participants 104 through the use of a blockchain. The processing server 102 may hold, operate, or otherwise perform management functions for one or more transaction accounts that may be used to hold funds received from the participants 104 in a social savings community, where the processing server 102 may, at a predetermined interval, pay out a reward from the social savings pool to one of the participants 104 in that respective social savings community. Throughout the process, the processing server 102 may utilize a blockchain associated with a blockchain network 106 for record keeping of all functions performed with respect to the social savings community including at least record keeping of the participants 104 of a community, all contributions made by the participants 104, and rewards paid out by the processing server 102 to participants.

The blockchain network 106 may be comprised of a plurality of nodes. Each node may be a computing device that is specifically configure to perform the functions of a node in a blockchain network 106, where each node is configured to, for example, verify proposed blockchain transactions, generate new blocks for the blockchain, validate new blocks, and maintain a copy of the blockchain. The blockchain itself may be comprised of a plurality of blocks, where each block includes at least a block header and one or more transaction data values.

A block header may include at least a timestamp, a block reference value, and a transaction reference value. The timestamp may be a time at which the block header is generated, or may refer to a time by which each of the transaction data values in the respective block may be submitted. The block reference value may be a reference to an earlier block in the blockchain, such as a reference to the block header of the most recent block (e.g., based on timestamp) added to the blockchain prior to the respective block. In some embodiments, the block reference value may be a hash value generated via hashing of the block header of the preceding block. The transaction reference value may be a reference to the transaction data values included in the respective block. In some embodiments, the transaction reference value may be the root of a Merkle tree that is generated using the transaction data values. The use of the reference values may ensure immutability of the blockchain, as any modification to a transaction data value or block header necessitates changing of the corresponding transaction reference value and the block reference value included in every subsequent block in the blockchain, which must be performed in a majority of nodes in the blockchain network 106, and prior to any new blocks being added, which may be computationally and communicatively impossible.

The transaction data values, also referred to here as blockchain data values, may each correspond to a social savings community and an action performed in association therewith. Transaction data values may include, for example, records of each participant 104 in a social savings community, transaction notifications for each contribution made to a social savings community, and transaction notifications for each reward paid out to a participant 104 by the processing server 102. In an exemplary embodiment, each social savings community may be assigned an identifier, referred to here as a community identifier. The community identifier may be a value that is unique to the social savings community used for identification of records or other actions or data associated with the respective social savings community. The community identifier may be a number, alphanumeric value, or other suitable type of value that may be randomly generated, pseudo-random, chosen by the participants 104 in the social savings community, or selected via another suitable method. In such embodiments, each transaction data value in the blockchain may include the identifier of the social savings community to which the transaction data value pertains.

In the system 100, a participant 104 may be issued a transaction account by an issuing institution 108. Each issuing institution 108 may be a financial institution, such as an issuing bank, or other entity configured to issue transaction accounts to participants 104 for use in funding payment transactions. In the system 100, each participant 104 in a social savings community may be issued a transaction account by an issuing institution 108 that may be used to fund contributions to their respective social savings community. In an exemplary embodiment, the participants 104 of a single social savings community may make their contributions from a plurality of different issuing institutions 108. In other embodiments, each participant 104 in a social savings community may utilize the same issuing institution 108.

The participant 104 may contact the processing server 102 and request to join a social savings community. The participant 104 may communicate with the processing server 102 using any suitable method, such as via a computing device (e.g., desktop computer, laptop computer, notebook computer, tablet computer, cellular phone, smart phone, smart watch, smart television, wearable computing device, etc.) that electronically communicates with the processing server 102 via a suitable method (e.g., web site, application program, application programming interface, etc.), or via an individual that may interact with the processing server 102 using any suitable method (e.g., in person, via telephone, short messaging service, e-mail, etc.). In some embodiments, the participant 104 may select a specific social savings community. For example, the participant 104 may be presented with a list of social savings communities that need additional participants and may select from the list. In other embodiments, the participant 104 may provide criteria or select criteria for a social savings community and then be placed into an appropriate social savings community by the processing server 102. For instance, the participant 104 may request to be placed in a community with a $1,000 contribution that is made monthly with a reward cycle of 12 months (e.g., where each participant 104 will have received a reward payout by the end of 12 months). The processing server 102 would receive such criteria from the participant 104 and place the participant 104 in a corresponding social savings community, which may, in some instances, be formed by the processing server 102 once a suitable number of participants 104 have requested to join a community after having provided the same criteria.

As part of the creation of a social savings community, each of the participants 104 may provide an account identifier or other information used in the identification of a transaction account to be used by the participant 104 in funding their contributions to the social savings community. The account identifier may be a unique value associated with the transaction account used in the identification thereof. In some cases, the account identifier may include, be comprised of, or may be included in payment credentials associated with the transaction account that, where payment credentials may be supplied to a payment network 110 to initiate payment of the contribution from the respective transaction account. In such cases, the account identifier may be, for example, a primary account number of the related transaction account. In some embodiments, the participants 104 may provide the account identifier at the time of requesting to join a social savings community. In other embodiments, the participants 104 may first be placed into the social savings community and then supply the account identifier prior to their first contribution, or the processing server 102 may receive the account identifier as part of the processing of the first contribution.

When a social savings community is created, the processing server 102 may generate or otherwise identify the community identifier associated therewith. The processing server 102 may then register the social savings community on the blockchain. The registration may include the addition of a new transaction data value on the blockchain that includes the community identifier and each of the account identifiers supplied by each of the participants 104 in the respective social savings community. Such data may be supplied to a node in the blockchain network 106, which may include the data in a blockchain data value that is added to a new block that is verified and added to the blockchain using suitable methods and systems. In some embodiments, the processing server 102 may be a node in the blockchain network 106. In such embodiments, the processing server 102 may generate a new block itself, which may be distributed to other nodes for verification, where, if verification is successful, the newly generated block is added to the blockchain.

Once a social savings community is registered, the first contributions may be made by each of the participants 104. In some embodiments, contributions may be facilitated by the processing server 102. In those embodiments, the processing server 102 may receive payment credentials from each participant 104 (e.g., which may be or may include the account identifier). The processing server 102 may then initiate a payment transaction for payment of the contribution amount for each participant 104 via a payment network 110. The payment transactions may be processed by the payment network 110 using traditional methods and systems, where each respective issuing institution 108 may authorize the transaction and approve the transfer of the contribution amount to a separate transaction account. The separate transaction account may be issued to or otherwise managed by the processing server 102, where it may hold the contributions made by the participants 104. In some cases, each social savings community may have a unique transaction account associated therewith. In other cases, the processing server 102 may utilize one or multiple transaction accounts that may receive funds for multiple social savings communities, which, in some cases, may be partitioned or otherwise separated accordingly. In some instances, the processing server 102 may have a transaction account with each issuing institution 108 and may facilitate contribution payments from each participant 104 to a transaction account at the same issuing institution 108 being used by the participant 104 to make their contribution.

In embodiments where contributions are not facilitated by the processing server 102, each participant 104 may be relied upon to make their own contribution. For instance, the processing server 102 may present each participant 104 with a bill to be paid by the participant 104 using traditional methods and systems. In such embodiments, the processing server 102 may receive a transaction notification or other indication of payment made by the participant 104 of the contribution amount to the appropriate transaction account for the social savings community.

For each contribution payment that is received by the processing server 102, the processing server 102 may update the blockchain accordingly. Updating of the blockchain may include the addition of a new transaction data value thereto that includes at least the account identifier associated with the transaction account or participant 104 from which the contribution was made, the contribution amount, and the community identifier. In some cases, additional information associated with the contribution transaction may be included in the transaction data value, such as a transaction number or other identifier, confirmation data, transaction time, transaction date, or any other transaction data that may be used for auditing, to prove the contribution, etc. In some cases, data associated with the transaction account to which the contribution was paid (e.g., an account identifier) may also be included in the transaction data value. The addition of the transaction data values into the blockchain may be used by each participant 104 to ensure that their contribution was tracked and confirmed and to also verify that ever other participant 104 in their social savings community properly contributed. In some embodiments, issuing institutions 108 may provide transaction notifications directly to nodes in the blockchain network 106 for updating of the block thereof accordingly. In these embodiments, the processing server 102 may not directly receive data for the contributions (e.g., except insofar as they may receive data from their issuing institution 108 related to the receipt of funds in their transaction account(s)), but may be able to review the blockchain to confirm the contributions and the associated participants (e.g., via community identifier and account identifiers).

Following the receipt of contributions, the processing server 102 may pay out a reward to one of the participants 104 in a social savings community at a predetermined interval. In many embodiments, the predetermined interval may be community-specific, where each social savings community may have a different reward interval. In some cases, the predetermined interval may be based on the number of participants 104, the reward cycle, or other data. Additionally, the reward amount may also vary from one savings community to another. For instance, one social savings community may have the entire contribution amount (e.g., the sum of the contributions for each participant 104 in the community less any applicable fees) paid out as a reward, while another social savings community may have half of the entire contribution paid out but may pay out rewards twice as often. For example, a first social savings community may have a reward of the entire community pool paid out every month with 12 members and a reward cycle of a year, while a second social savings community may have half of the entire contribution amount paid out twice a month with 24 members and a reward cycle of two years. In some cases, a social savings community may have multiple reward schemes associated therewith. For example, the social savings community may opt to have only half of the entire contribution amount paid at each reward pay out, where the remainder may be saved until the end of the reward cycle and distributed equally among the participants 104. For instance, the participants 104 in a social savings community may agree to receive the half contribution rewards throughout the year with the larger reward being received on December 1st each year for use in covering holiday expenses.

In some embodiments, the processing server 102 may select a participant 104 in a social savings community to receive the reward randomly or pseudo-randomly. In other embodiments, a schedule (e.g., list) of participants 104 may be followed for selection of reward payments thereto. In such embodiments, the schedule may be selected by the participants 104 during creation of the social savings community, may be based on the join order of the participants, may be randomly generated, etc. In an exemplary embodiment, the processing server 102 may also select participants 104 such that every participant 104 only receives a single reward payment (e.g., or a predetermined number of reward payments as applicable based on reward scheme) during a reward cycle or prior to each participant 104 also receiving a reward payment.

Once a participant 104 is selected, the processing server 102 may initiate payment of the reward amount to the participant 104 from a transaction account managed by the processing server 102. In cases where the processing server 102 was supplied with account information, the processing server 102 may use the account information and initiate payment from its transaction account to the participant's transaction account to be processed via the payment network 110. In other cases, the processing server 102 may contact the participant 104 to request payment information for receipt of the reward funds. In some instances, the reward payment may be made via a check or other suitable payment instrument that is distributed to the participant 104 using a suitable method. The participant 104 may thus receive the reward pay out. The processing server 102 may be configured to update the blockchain to add a new transaction data value that includes a data associated with the reward payment, including at least the account identifier associated with the participant 104 that received the reward, the reward amount, and the community identifier. Other participants 104 in the social savings community may thus be able to monitor the reward payments to ensure that they are made correctly and in compliance with the reward scheme, and that they are being distributed fairly among the participants 104 in the social savings community.

The contribution and pay out processes may be repeated by the processing server 102 in accordance with the reward scheme set for the social savings community. For instance, one social savings community may repeat reward cycles for a predetermined number of times or indefinitely, where it may only be stopped upon agreement by the participants 104 or may continue where participants 104 may be traded out for others (e.g., one participant 104 may leave but be replaced by a new participant 104), while another social savings community may dissolve after a single reward cycle.

The methods and systems discussed herein thus enable participants 104 to join a social savings community without restriction on their issuing institution 108, without requiring pooling of funds into a single transaction account, and even without a participant 104 having to be made aware of or have any knowledge of any of the other participants 104 in their social savings community. The use of a blockchain for record keeping for the social savings community provides for an immutable record that can provide accurate and fraud-proof accounting, which may provide peace of mind to participants 104 and ensure that all contributions and reward payments are made correctly even in cases where multiple issuing institutions 108 may be used or where contributions are made into multiple transaction accounts, which may themselves be spread across multiple issuing institutions 108. Thus, the blockchain facilitates social savings communities with little, if any, restrictions that can enable participants 104 to easily and securely participate in social savings communities that are funded via electronic payment transactions.

Processing Server

Figure 2:
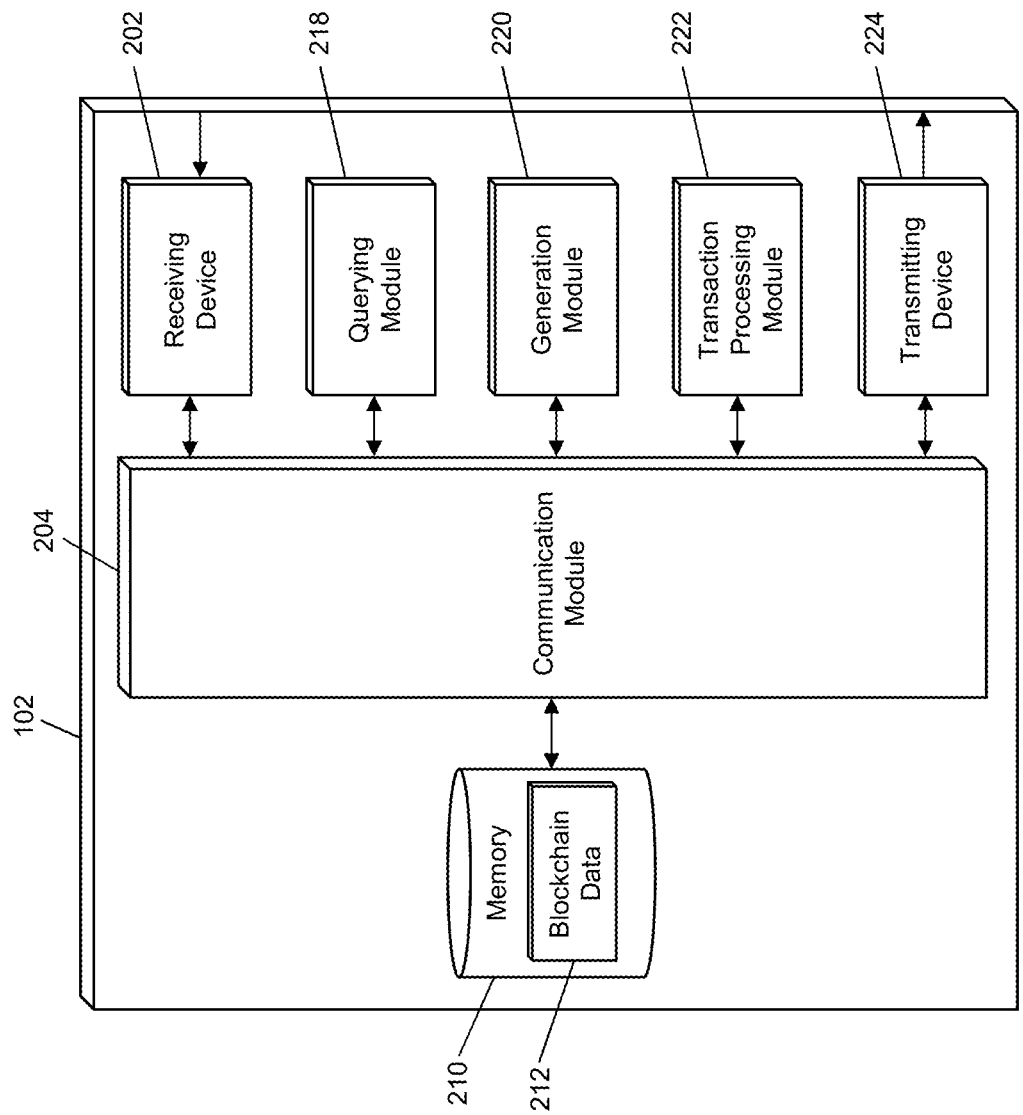
FIG. 2 is a block diagram illustrating the processing server of the system of FIG. 1 for performing social savings via blockchain in accordance with exemplary embodiments.

FIG. 2 illustrates an embodiment of a processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 500 illustrated in FIG. 5 and discussed in more detail below may be a suitable configuration of the processing server 102.

The processing server 102 may include a receiving device 202. The receiving device 202 may be configured to receive data over one or more networks via one or more network protocols. In some instances, the receiving device 202 may be configured to receive data from participants 104, blockchain networks 106 and nodes thereof, payment networks 110, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by participants 104 via computing devices associated therewith or other suitable sources, which may be superimposed or otherwise encoded with registration data. The registration data may include an account identifier and a selection of a social savings community or criteria used to identify a social savings community for the participant 104. In some cases, the registration data may include payment credentials for a transaction account used for contributions to the social savings community. The receiving device 202 may also be configured to receive data signals electronically transmitted by nodes in a blockchain network 106, which may be superimposed or otherwise encoded with blocks in an associated blockchain. In some cases, the nodes may supply the transaction data values themselves, such as may be supplied in response to a request for transaction data values including a specific community identifier. The receiving device 202 may also be configured to receive data signals electronically transmitted by payment networks 110, which may be transmitted via payment rails associated therewith and may be specially formatted transaction messages (e.g., ISO 8583 or ISO 20022 transaction messages), that may be used by the processing server 102 as transaction confirmations for contributions or reward payments.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 218, generation module 220, transaction processing module 222, etc. As used herein, the term "module" may be software or hardware particularly programmed to receive an input, perform one or more processes using the input, and provides an output. The input, output, and processes performed by various modules will be apparent to one skilled in the art based upon the present disclosure.

The processing server 102 may also include a memory 210. The memory 210 may be configured to store data for use by the processing server 102 in performing the functions discussed herein, such as public and private keys, symmetric keys, etc. The memory 210 may be configured to store data using suitable data formatting methods and schema and may be any suitable type of memory, such as read-only memory, random access memory, etc. The memory 210 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 210 may be comprised of or may otherwise include a relational database that utilizes structured query language for the storage, identification, modifying, updating, accessing, etc. of structured data sets stored therein.

The memory 210 may be configured to store, for example, blockchain data 212, where the blockchain data 212 may include blocks and/or transaction data values included therein. In some cases, the blockchain data 212 may include the entire blockchain, such as in embodiments where the processing server 102 may be a node in the blockchain network 106. The memory 210 may also be configured to store additional data used in the performing of the functions discussed herein, such as reward scheme data for social savings communities, community registration data, payment credentials, etc.

The processing server 102 may include a querying module 218. The querying module 218 may be configured to execute queries on databases to identify information. The querying module 218 may receive one or more data values or query strings, and may execute a query string based thereon on an indicated database, such as the memory 210, to identify information stored therein. The querying module 218 may then output the identified information to an appropriate engine or module of the processing server 102 as necessary. The querying module 218 may, for example, execute a query on the memory 210 to identify blockchain data 212 associated with a social savings community (e.g., identified via the community identifier) to determine which participants 104 have already received a reward payment during a reward cycle for filtering of the selection of a new participant 104 for a new reward payment.

The processing server 102 may also include a generation module 220. The generation module 220 may be configured to generate data for use by the processing server 102 in performing the functions discussed herein. The generation module 220 may receive instructions as input, may generate data based on the instructions, and may output the generated data to one or more modules of the processing server 102. For example, the generation module 220 may be configured to generate notifications and other data messages for transmission to participants 104, may be configured to generate data messages that include transaction data values or data for inclusion therein for transmission to blockchain nodes, etc. In embodiments where the processing server 102 may be a node in the blockchain network 106, the generation module 220 may be configured to generate reference values, block headers, and new blocks as part of the traditional functions as a node in a blockchain network 106.

The processing server 102 may also include a transaction processing module 222. The transaction processing module 222 may be configured to perform functions associated with the processing of transactions as part of the processing server 102 as discussed herein. For example, the transaction processing module 222 may be configured to initiate payment transactions for the payment of contributions from participants 104 in a social savings community, as well as the initiation of payment transactions for reward payments made out to participants 104 in a social savings community. The transaction processing module 222 may also be configured to perform transfers between transaction accounts and other management functions associated with transaction accounts that may be managed by the processing server 102 and used in the collection of contributions and/or payment of rewards.

The processing server 102 may also include a transmitting device 224. The transmitting device 224 may be configured to transmit data over one or more networks via one or more network protocols. In some instances, the transmitting device 224 may be configured to transmit data to participants 104, blockchain networks 106 and nodes thereof, payment networks 110, and other entities via one or more communication methods, local area networks, wireless area networks, cellular communication, Bluetooth, radio frequency, the Internet, etc. In some embodiments, the transmitting device 224 may be comprised of multiple devices, such as different transmitting devices for transmitting data over different networks, such as a first transmitting device for transmitting data over a local area network and a second transmitting device for transmitting data via the Internet. The transmitting device 224 may electronically transmit data signals that have data superimposed that may be parsed by a receiving computing device. In some instances, the transmitting device 224 may include one or more modules for superimposing, encoding, or otherwise formatting data into data signals suitable for transmission.

The transmitting device 224 may be configured to electronically transmit data signals to participants 104 (e.g., via computing devices associated therewith) that are superimposed or otherwise encoded with lists of social savings communities for joining, social savings community criteria for selection, reward scheme criteria for selection, notifications regarding contributions and reward payments, and other data as discussed herein. The transmitting device 224 may also be configured to electronically transmit data signals to nodes in the blockchain network 106 that may be superimposed or otherwise encoded with transaction data values or data for inclusion thereof, such as account identifiers, community identifiers, transaction amounts, transaction data, etc. The transmitting device 224 may also be configured to electronically transmit data signals to payment networks 110, which may be transmitted via payment rails associated therewith, and may include transaction messages that are formatted according to one or more standards, such as the International Organization for Standardization's ISO 8583 or ISO 20022 standards, for payment of contributions by participants 104 or payment of rewards to participants 104.

Process for Social Savings Contributions and Rewards with Blockchain

Figure 3:
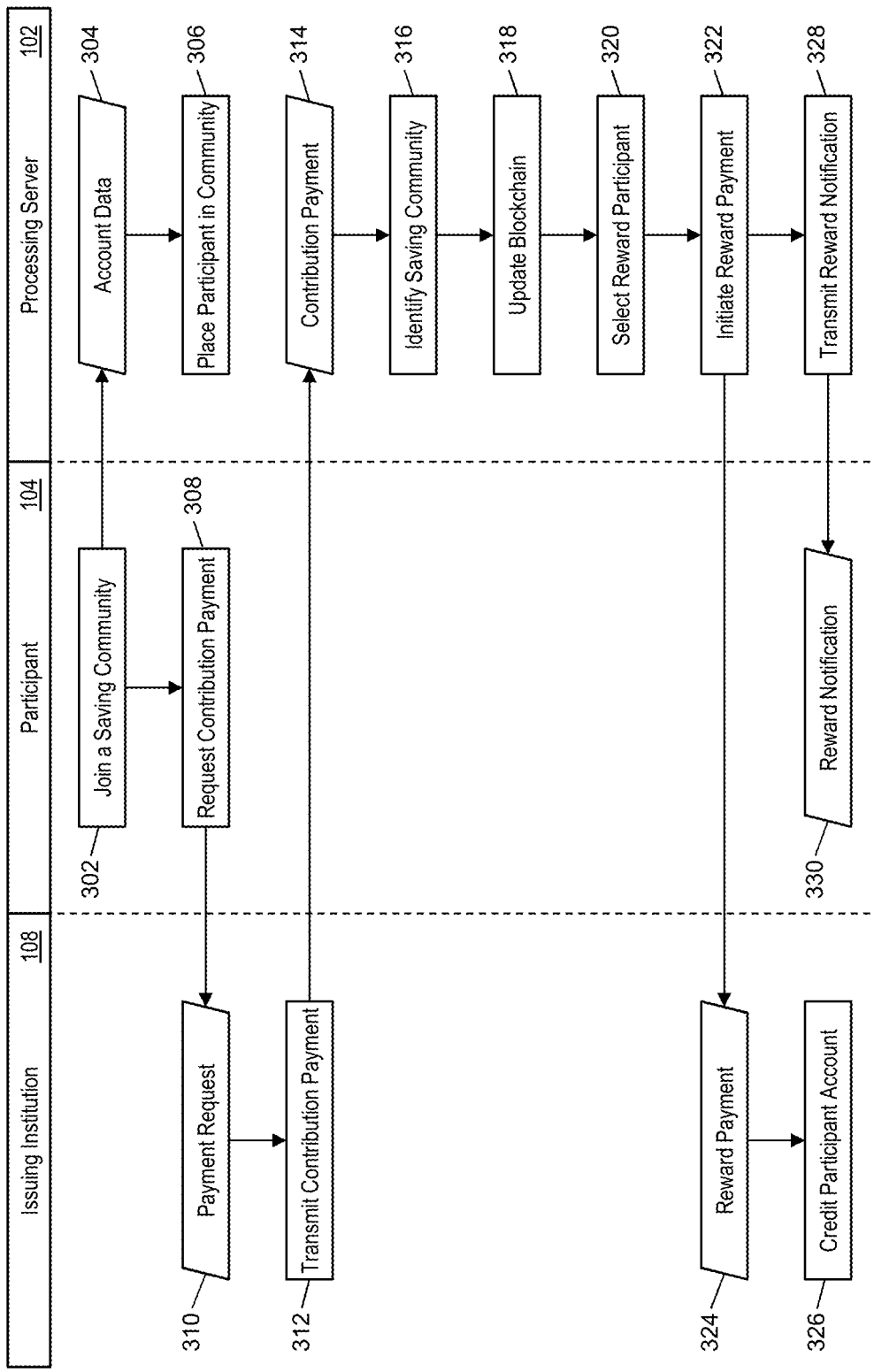
FIG. 3 is a flow diagram illustrating a process for social saving via blockchain using the system of FIG. 1 in accordance with exemplary embodiments.

FIG. 3 illustrates an example process executed in the system 100 of FIG. 1 for the facilitating of a social savings community for participants 104 across multiple issuing institutions 108 via the use of a blockchain.

In step 302, a participant 104 may request to join a social saving community. As part of the request, the participant 104 may submit (e.g., via a computing device or other suitable method) account data associated with a transaction account to be used to fund contributions to the social savings community and data used in the selection of a social savings community to the processing server 102. In step 304, the receiving device 202 of the processing server 102 may receive the registration data from the participant 104 including the account data and selection data. In some cases, the selection may identify a specific social savings community (e.g., via community identifier). In other cases, the selection may specify criteria (e.g., reward cycle, contribution amount, etc.) desired by the participant 104. In step 306, the processing server 102 may identify a community for the participant 104 to join and place the participant 104 in the appropriate social savings community. Placement in the community may include updating any internal (e.g., stored in the memory 210 of the processing server 102) record of the community as well as electronically transmitting a notification to the blockchain network 106 to add a new transaction data value that includes the account identifier received from the participant 104, the community identifier associated with the social savings community, and the account identifiers for the other participants 104 in the same social savings community.

In step 308, the participant 104 may submit a request to their issuing institution 108 to make their first contribution payment for their social savings community. In some cases, the participant 104 may be prompted via a bill or other form of notice provided by the processing server 102. In some embodiments, the participant 104 may be provided with (e.g., by the processing server 102) information regarding the transaction account or entity to which the contribution is to be paid. In step 310, the issuing institution 108 may receive the request from the participant 104, which may include any authentication or account information that may be necessary for the issuing institution 108, information regarding where the payment is to be made, as well as the transaction amount for the contribution payment. In step 312, the issuing institution 108 may make the contribution payment to the specified entity/transaction account. In step 314, the receiving device 202 of the processing server 102 may receive a notification of the contribution payment, which may include at least the account identifier associated with the participant 104 that made the contribution.

In step 316, the querying module 218 of the processing server 102 may execute a query on the memory 210 of the processing server 102 to identify what social savings community the contribution was made for. In some cases, the transaction notification may include the community identifier (e.g., if supplied by the participant 104 as part of the transaction). In other cases, the processing server 102 may identify the social savings community based on the account identifier, and, if necessary, may also utilize the contribution amount, date of contribution, and/or additional data. In step 318, the transmitting device 224 of the processing server 102 may electronically transmit a data message to a node in the blockchain network 106 to add a new blockchain data value for the contribution payment that includes at least the account identifier for the participant 104, community identifier for the identified social savings community, and the transaction amount of the contribution. The blockchain may be updated accordingly, where the processing server 102 may be able to verify the addition of the blockchain data value when viewing the updated blockchain data.

In step 320, the processing server 102 may identify a participant 104 for the disbursement of a reward for the social savings community. It will be apparent to persons having skill in the art that step 320 may not occur until a predetermined time and may require payment of the contributions by every participant 104 in a social savings community, or where selection of the participant 104 and the reward amount may be based on contributions (e.g., if only 10 of 12 participants contribute, the reward amount may be adjusted accordingly and only one of the 10 participants eligible for the reward). In an exemplary embodiment, a participant 104 may only be eligible to receive the reward once (e.g., or other predetermined number of times) per reward cycle for the social savings community. In step 322, the processing server 102 may initiate payment of the reward amount to the transaction account registered by the selected reward participant 104.

In step 324, the issuing institution 108 that issued the transaction account to which the reward is paid may receive the payment of the reward amount from the processing server 102. In step 326, the issuing institution 108 may credit the transaction account for the participant 104 with the reward payment. In step 328, the transmitting device 224 of the processing server 102 may electronically transmit a notification message to the selected reward participant 104 to inform the participant 104 that they were selected for and paid the reward amount for the social savings community. In step 330, the participant 104 may receive, via any suitable method, the reward notification.

Exemplary Method for Social Saving Via Blockchain

Figure 4:
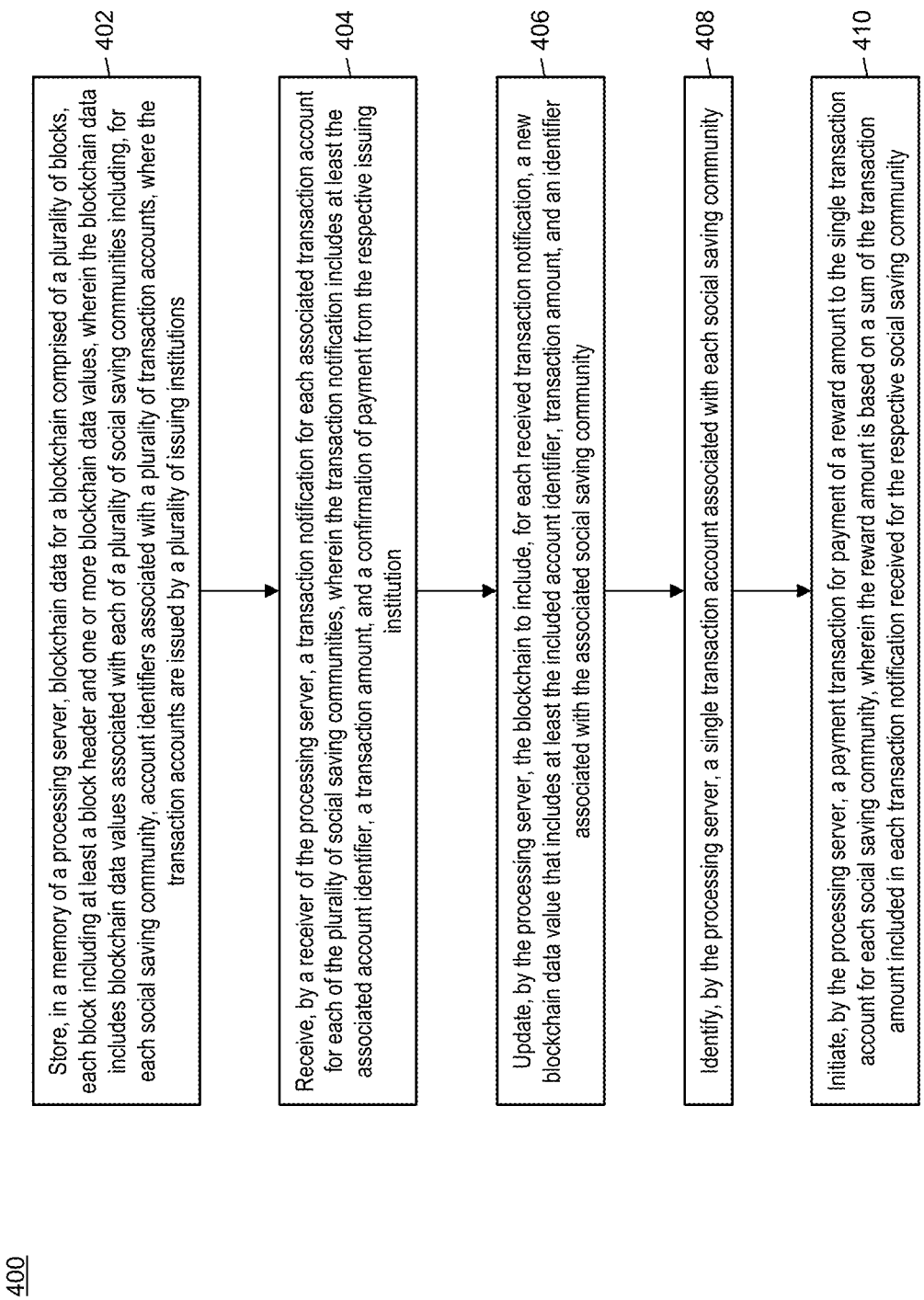
FIG. 4 is a flow chart illustrating an exemplary method for social saving via blockchain in accordance with exemplary embodiments.

FIG. 4 illustrates a method 400 for the facilitating of a social savings community funded via electronic payment transactions via multiple issuing institutions using a blockchain.

In step 402, blockchain data (e.g., blockchain data 212) may be stored in a memory (e.g., the memory 210) of a processing server (e.g., the processing server 102), wherein the blockchain data may be for a blockchain comprised of a plurality of blocks, each block including at least a block header and one or more blockchain data values, wherein the blockchain data includes blockchain data values associated with each of a plurality of social saving communities including, for each social saving community, account identifiers associated with a plurality of transaction accounts, where the transaction accounts are issued by a plurality of issuing institutions (e.g., issuing institutions 108). In step 404, a transaction notification may be received by a receiving (e.g., the receiving device 202) of the processing server for each associated transaction account for each of the plurality of social saving communities, wherein the transaction notification includes at least the associated account identifier, a transaction amount, and a confirmation of payment from the respective issuing institution.

In step 406, the blockchain may be updated by the processing server to include, for each received transaction notification, a new blockchain data value that includes at least the included account identifier, transaction amount, and an identifier associated with the associated social saving community. In step 408, a single transaction account associated with each social saving community may be identified by the processing server. In step 410, a payment transaction for payment of a reward amount to the single transaction account may be initiated by the processing server for each social saving community, wherein the reward amount is based on a sum of the transaction amount included in each transaction notification received for the respective social saving community.

In one embodiment, the transaction amount included in the transaction notification for each transaction account in a given social saving community may be a common transaction amount. In some embodiments, the reward amount may be the sum of the transaction amount included in each transaction notification received for the respective social saving community minus one or more predetermined fees. In one embodiment, the transaction accounts associated with each social saving community may be issued by at least two distinct issuing institutions. In one embodiment, each transaction notification may correspond to a payment transaction resulting in payment of the respective transaction amount from the respective transaction account to a single receiving account. In some embodiments, the method 400 may further include updating, by the processing server, the blockchain to include, for each initiated payment transaction, a new blockchain data value including at least the reward amount, single transaction account, and identifier associated with the social saving community.

In one embodiment, updating the blockchain may include electronically transmitting, by a transmitter (e.g., the transmitting device 224) of the processing server, at least the associated account identifier, transaction amount, and identifier associated with the associated social saving community for each received transaction notification to a node in a blockchain network associated with the blockchain. In some embodiments, updating the blockchain may include identifying, by the processing server, one or more groups of the new blockchain data values, generating, by the processing server, a data reference value and a block reference value for each of the one or more groups, generating, by the processing server, a new block header and new block for each of the one or more groups, and transmitting, by a transmitter of the processing server, each generated new block to one or more nodes in a blockchain network associated with the blockchain.

Computer System Architecture

Figure 5:
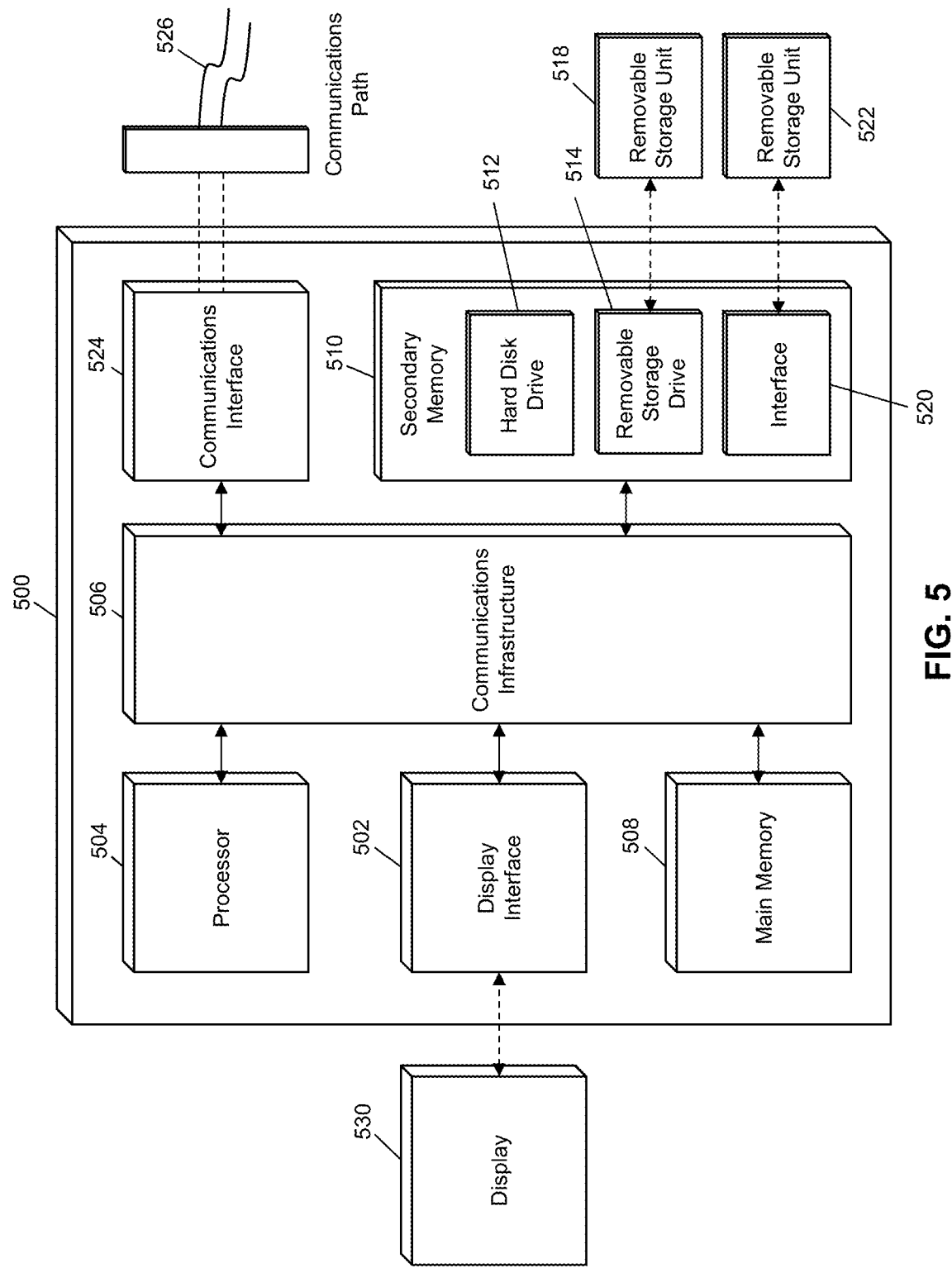
FIG. 5 is a block diagram illustrating a computer system architecture in accordance with exemplary embodiments.

FIG. 5 illustrates a computer system 500 in which embodiments of the present disclosure, or portions thereof, may be implemented as computer-readable code. For example, the processing server 102 of FIG. 1 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for social saving via blockchain. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:
1. A method for social saving via blockchain, comprising:
    storing, in a memory of a processing server, blockchain data for a blockchain comprised of a plurality of blocks, each block including at least a block header and one or more blockchain data values, wherein the blockchain data includes blockchain data values associated with each of a plurality of social saving communities including, for each social saving community, account identifiers associated with a plurality of transaction accounts, where the transaction accounts are issued by a plurality of issuing institutions;
    receiving, by a receiver of the processing server, a transaction notification for each associated transaction account for each of the plurality of social saving communities, wherein the transaction notification includes at least the associated account identifier, a transaction amount, and a confirmation of payment from the respective issuing institution;
    updating, by the processing server, the blockchain to include, for each received transaction notification, a new blockchain data value that includes at least the included account identifier, transaction amount, and an identifier associated with the associated social saving community;

identifying, by the processing server, a single transaction account associated with each social saving community; and initiating, by the processing server, a payment transaction for payment of a reward amount to the single transaction account for each social saving community, wherein the reward amount is based on a sum of the transaction amount included in each transaction notification received for the respective social saving community.

2. The method of claim 1, wherein the transaction amount included in the transaction notification for each transaction account in a given social saving community is a common transaction amount.

3. The method of claim 1, wherein the reward amount is the sum of the transaction amount included in each transaction notification received for the respective social saving community minus one or more predetermined fees.

4. The method of claim 1, wherein updating the blockchain includes:

electronically transmitting, by a transmitter of the processing server, at least the associated account identifier, transaction amount, and identifier associated with the associated social saving community for each received transaction notification to a node in a blockchain network associated with the blockchain.

5. The method of claim 1, wherein updating the blockchain includes:

identifying, by the processing server, one or more groups of the new blockchain data values, generating, by the processing server, a data reference value and a block reference value for each of the one or more groups, generating, by the processing server, a new block header and new block for each of the one or more groups, and transmitting, by a transmitter of the processing server, each generated new block to one or more nodes in a blockchain network associated with the blockchain.

6. The method of claim 1, wherein the transaction accounts associated with each social saving community are issued by at least two distinct issuing institutions.

7. The method of claim 1, wherein each transaction notification corresponds to a payment transaction resulting in payment of the respective transaction amount from the respective transaction account to a single receiving account.

8. The method of claim 1, further comprising:

updating, by the processing server, the blockchain to include, for each initiated payment transaction, a new blockchain data value including at least the reward amount, single transaction account, and identifier associated with the social saving community.

9. A system for social saving via blockchain, comprising:

a memory of a processing server configured to store blockchain data for a blockchain comprised of a plurality of blocks, each block including at least a block header and one or more blockchain data values, wherein the blockchain data includes blockchain data values associated with each of a plurality of social saving communities including, for each social saving community, account identifiers associated with a plurality of transaction accounts, where the transaction accounts are issued by a plurality of issuing institutions;

a receiver of the processing server configured to receive a transaction notification for each associated transaction account for each of the plurality of social saving communities, wherein the transaction notification includes at least the associated account identifier, a transaction amount, and a confirmation of payment from the respective issuing institution; and the processing server, wherein the processing server is configured to update the blockchain to include, for each received transaction notification, a new blockchain data value that includes at least the included account identifier, transaction amount, and an identifier associated with the associated social saving community, identify a single transaction account associated with each social saving community, and initiate a payment transaction for payment of a reward amount to the single transaction account for each social saving community, wherein the reward amount is based on a sum of the transaction amount included in each transaction notification received for the respective social saving community.

10. The system of claim 9, wherein the transaction amount included in the transaction notification for each transaction account in a given social saving community is a common transaction amount.

11. The system of claim 9, wherein the reward amount is the sum of the transaction amount included in each transaction notification received for the respective social saving community minus one or more predetermined fees.

12. The system of claim 9, wherein updating the blockchain includes:

electronically transmitting, by a transmitter of the processing server, at least the associated account identifier, transaction amount, and identifier associated with the associated social saving community for each received transaction notification to a node in a blockchain network associated with the blockchain.

13. The system of claim 9, wherein updating the blockchain includes:

identifying, by the processing server, one or more groups of the new blockchain data values, generating, by the processing server, a data reference value and a block reference value for each of the one or more groups, generating, by the processing server, a new block header and new block for each of the one or more groups, and transmitting, by a transmitter of the processing server, each generated new block to one or more nodes in a blockchain network associated with the blockchain.

14. The system of claim 9, wherein the transaction accounts associated with each social saving community are issued by at least two distinct issuing institutions.

15. The system of claim 9, wherein each transaction notification corresponds to a payment transaction resulting in payment of the respective transaction amount from the respective transaction account to a single receiving account.

16. The system of claim 9, wherein the processing server is further configured to update the blockchain to include, for each initiated payment transaction, a new blockchain data value including at least the reward amount, single transaction account, and identifier associated with the social saving community.

* * * * *